United States Patent [19]

Hinds et al.

[11] Patent Number: 4,877,386
[45] Date of Patent: Oct. 31, 1989

[54] AUTOMATED SUCKER ROD CLEANING APPARATUS

[75] Inventors: Robert B. Hinds, Borger; Charles B. Hutchinson, Jr., Fritch; James S. Dowell, Phillips, all of Tex.

[73] Assignee: J.M. Huber Corporation, Rumson, N.J.

[21] Appl. No.: 287,414

[22] Filed: Dec. 20, 1988

[51] Int. Cl.⁴ .......................... B29C 45/14; B08B 1/04
[52] U.S. Cl. .......................................... 425/110; 15/88; 166/176; 264/259; 425/392; 425/542
[58] Field of Search ............... 425/110, 114, 210, 542, 425/392; 264/259, 233, 251, 135; 166/176, 241; 15/88, 104.04

[56] References Cited

U.S. PATENT DOCUMENTS

| | | | |
|---|---|---|---|
| 1,647,499 | 11/1927 | Bly | 15/104.04 X |
| 1,718,757 | 6/1929 | Morris | 15/104.04 X |
| 2,293,865 | 8/1942 | Sykes | 15/88 X |
| 2,641,008 | 6/1953 | Smith | 15/104.04 X |
| 2,682,068 | 6/1954 | Harrigan | 15/88 |
| 2,960,706 | 11/1960 | Dunham | 15/88 X |
| 3,251,919 | 1/1961 | Ell | 264/251 |
| 3,490,526 | 1/1970 | Collett | 166/176 |
| 3,499,210 | 3/1970 | Schellstede | 29/447 |
| 3,560,060 | 2/1971 | Morris | 166/241 X |
| 3,958,049 | 5/1976 | Payne | 427/327 |
| 4,088,185 | 5/1978 | Carson | 166/176 |
| 4,205,407 | 6/1980 | King et al. | 15/88 |
| 4,279,850 | 7/1981 | Lynch | 264/135 |
| 4,372,003 | 2/1983 | Toelke | 15/88 |

Primary Examiner—Richard L. Chiesa
Attorney, Agent, or Firm—Alec H. Horn; Harold H. Flanders; Robert L. Price

[57] ABSTRACT

An automated apparatus for molding rod guides directly onto oilfield sucker rods including an apparatus for cleaning a short pre-determined section of the rod prior to the rod receiving a molded rod guide. The rod cleaning apparatus comprises a substantially linear member secured to a frame which reciprocates a pre-selected stroke distance. The rod to be cleaned is rotated and a plurality of brush assemblies mounted on the linear member engage the rotating rod at pre-selected points to clean a pre-determined length of the rod in preparation for receiving a rod guide. This automated system prepares rods for molding at a much faster rate without the requirement of large volumes of compressed air for sandblasting.

11 Claims, 3 Drawing Sheets

AUTOMATED SUCKER ROD CLEANING APPARATUS

BACKGROUND OF THE INVENTION

This invention relates to apparatus for molding paraffin scrapers, also known as rod guides, directly onto oil field sucker rods, and more particularly, to apparatus for cleaning a short pre-determined section of the rod prior to the rod receiving a molded rod guide.

An oil well generally comprises a casing, a string of smaller steel tubing inside the casing, a pump at the bottom of the well and a string of steel rods, commonly referred to as sucker rods, within the tubing and extending into the pump for operating the pump. Various devices well known in the art are provided at the top of the well for reciprocating the sucker rod to operate the pump.

The movement of sucker rods through the tubing has given rise to several problems. Crude oil may contain paraffin and other substances which tend to congeal and deposit upon the walls of the tubing restricting the passage of oil. Second, the reciprocation of the sucker rod in the tubing causes bowing of the rod during compression, resulting in tubing contact and premature wear of the interior surface of the tubing. Third, misalignment of the well bore from true vertical may sometimes result in the sucker rod dragging upon one side or another of the tubing causing additional wear.

A common mode of removing paraffin deposits on the tubing, centering the sucker rod during compression, and reducing abrasive wear of the interior surface of the tubing comprises attaching polymer rod guides to various points along the length of the rod. Typically eight but as few as two and as many as twelve guides may be used. For a thorough discussion of rod guide history and technology, reference may be made to U.S. Pat. No. 4,088,185 to Carson, which is hereby incorporated by reference.

In order for a mold in place rod guide to adhere adequately to the surface of a rod, the rod must be clean. Sucker rods, either new or reclaimed, are coated with either rust or a tar-like corrosion inhibitor which must be removed before the molded guide will adhere properly to the metal. In the past, a steel brush was manually abraded against the rod and the guide molded thereon. In addition to being highly labor intensive, this process was undesirable because hand brushing would often leave small areas unclean. The remaining inhibitor coating would intermix with the molten polymer during molding and severely affect the adherence of the guide to the rod.

This manual technique quickly gave way to a sandblasting process, wherein a rod to be cleaned was fed linearly into a sandblasting cleaning station. The stationary rod was radially surrounded by a group of sandblasting nozzles and the nozzles activated in sequence to thoroughly clean all sides of the rod. When this section was complete, the rod was linearly moved through the cleaning station until the next pre-determined cleaning site was reached and the process repeated.

Although effective, this process has several disadvantages. This process is slow because each site is cleaned in series and the cleaning process becomes a severe bottleneck in the molding operation. This disadvantage has become more serious through the years as the trend to more guides per rod has become more pronounced.

Another disadvantage is this process produces large quantities of fine spent blasting sand requiring disposal. The environmentally safe removal of this spent sand is troublesome and expensive.

Yet another disadvantage of this process is the requirement for large volumes of compressed air. If greater numbers of blast nozzles are utilized, much larger compressors would be needed. This substantial increase in capital cost renders the use of multiple sand blasting stations uneconomical. The sophisticated equipment needed to adequately perform the task is very expensive yet prone to rapid wear and mechanical failure due to the ubiquitous presence of blasting sand grit.

Yet another disadvantage is the required use of blasting sand nozzles which yields a "feathered" edge between cleaned and uncleaned rod rather than a sharply defined edge. This means that either more than needed area must be cleaned, which wastes time and effort, or a portion of rod is inadequately cleaned resulting in inadequate adhesion of the guide to the rods.

In the blasting sand cleaning station it is very difficult to adjust the length of rod section to be cleaned and the amount of cleaning required. Modern rod guides vary in design to address the problems of individual wells and as such are not always of a uniform length. Likewise, rods are received in various condition and some require more cleaning than others. Adjustment of the spacing of sandblasting nozzles and their proper sequencing is very time consuming.

Using a conventional sandblasting rod cleaning station it is very difficult to clean a section of the rod very close to the sucker rod joint or "box". Current experience now indicates this location near the joint to be one of the most desirable places to put a rod guide.

In addition to sandblasting apparatus, mechanically similar computer controlled apparatus utilizing chemical solvents has been employed. In addition to many of the above disadvantages associated with sandblasting, solvent blasting systems are very difficult to adjust to accommodate unequal spacing of guides along the rod. Typically a rod has a guide molded on while another site on the same rod is being cleaned. This reduces wasted molding time but impairs flexibility of guide site spacing. Another disadvantage is that the expensive and potentially dangerous solvents used require careful handling to avoid contact with personnel operating the equipment and environmentally unsafe disposal.

These and other disadvantages of the prior art are overcome by the following invention by providing a quickly adjustable, inexpensive apparatus for simultaneously cleaning a plurality of sites in a rod.

SUMMARY OF THE INVENTION

The present invention is directed to an automated system for molding polymer rod guides on to oilfield sucker rods. This system includes a means for feeding rods into an apparatus for cleaning rods, an apparatus for cleaning a pre-determined section of the rod which is to receive the rod guide, a means for conveying the clean rod to the molding apparatus and an injection molding apparatus for receiving this cleaned rod and molding a rod guide thereon. The rod cleaning apparatus comprises a substantially linear member secured to a frame which reciprocates a pre-selected stroke distance along the member axis. A means for reciprocating this linear member and a means for rotating the rod about a rod axis, substantially parallel to the member axis, is provided.

A plurality of rotatable rod rollers are attached to the frame for both supporting and rotating the rod and urging the rod along the rod axis to securely place the rod in a position for cleaning. At least one brush assembly is releasably mounted on the reciprocating linear member.

Each brush assembly includes a rotatable metal wire brush on a rotationally powered shaft for engaging and cleaning the rod, and a brush support for releasably mounting the brush at a pre-selected point along the reciprocating linear member. When the brush assembly is releasably mounted at a pre-selected point on the reciprocating linear member and the brush engages the rod and rotates, the reciprocating movement of the linear member cleans a pre-determined length of the rod.

An object of the present invention is to clean a precise distance on a rod from one pre-selected point to another, sufficient to receive a molded on rod guide.

It is a further object of the present invention to provide an automated system which cleans the rod as fast as rod guides may be molded onto the cleaned rod.

It is another object of the present invention to provide a plurality of cleaning brushes which clean several rod sections simultaneously in order to minimize rod cleaning time.

It is another object of the present invention to provide a rod cleaning apparatus which may be quickly and simply adjusted to vary the number and spacing of cleaned sites along the rod, the length of the clean site, and the amount of cleaning time spent at each site.

It is another feature of the present invention to provide an inexpensive and simple rod cleaning system which is not prone to mechanical breakdown.

It is another feature of the present invention to provide an automated rod cleaning system which does not require disposal of spent blasting sand or solvents.

These and other features and objects of the present invention will become apparent from the following description wherein reference is made to the figures in the accompanying drawings.

DESCRIPTION OF PREFERRED EMBODIMENTS

Figure 1:
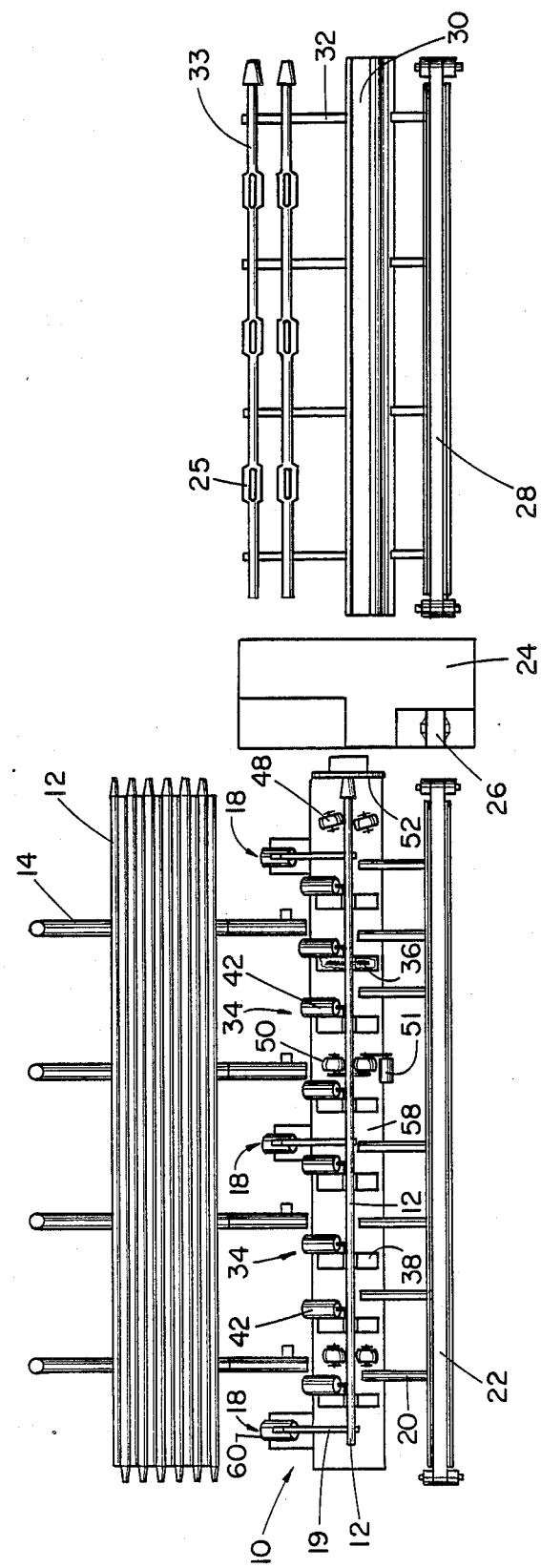
FIG. 1 is a top view of a system for molding guides on rods.

Referring now to the drawings, FIG. 1 shows a top view of a system for molding rod guides on rods. A bundle of rods (12) to have guides molded thereon is placed on a rod support rack (14) and unbundled. Each rod is individually fed onto the rod cleaning apparatus (10) by means of a rod indexing assembly (18) and is placed in the trough formed between radially spaced pairs of drive rollers (50) and guide rollers (48).

These plurality of rollers support the rod along the length of the rod cleaning apparatus to position the rod along a rod axis. The number of pairs of rollers can vary as required but three pair of guide rollers and two pair of drive rollers have been found adequate. If desired the rollers may be staggered along the rod rather than in pairs.

The drive rollers (50) are both rotated in the same direction causing the rod (12) to be rotated at about 100-170 rpm. The rotation of the rod need not be rapid and may be adjusted to provide even coverage and avoid "spiraling". The rollers should have sufficient friction against the rod to minimize slipping. Elastomeric wheels have proven adequate. In addition to helping support the rod, the guide rollers (48), whose axes are set at an angle of about 10-15 degrees to the rod axis, serve to urge the rod in an axial direction. This axial travel results in an end of rod (12) being forced against a rotary circular stop plate (52). This stop plate (52), which is coaxial with the axis of the rod, stops the linear or axial movement of the rod and may serve as fixed point from which the location of cleaning sites are measured. This constant axial bias force counterbalanced by the revolving stop place (52) assures that each rod is snugly held in the proper position for cleaning at a pre-determined location.

A plurality of brush assemblies (34) are releasably mounted at preselected points along the axis of the rod cleaning frame (58). These brush assemblies contain rotary brushes (36) which radially intersect the rod axis to contact and abrade the rod as later described in more detail.

After the rod (12) has been cleaned, the rod indexing assembly (18) discharges the rod from the rod cleaning apparatus (10) onto an inclined discharge rack (20). Discharge rack (20) is inclined such that the rod (12) will roll from the rack (20) onto a conveyor (22). If desired, conveyor means (22) may include several conveyor belts stacked one upon the other and discharge rack (20) may be hydraulically adjusted to place the rod into any level of conveyor means (22) desired.

The cleaned rod is conveyed to an injection molding machine (24) containing one or more molds (26) and a polymer rod guide is molded precisely over the cleaned area, preferably as described in U.S. Pat. No. 4,088,185. The rod, now bearing a plurality of rod guides (25), is discharged from the molding machine 24 onto a conveyor (28) which again may include a plurality of stacked conveyor belts one upon the other. From conveyor means (28) the rods are placed first in a dip tank (30) where a new coating of corrosion inhibitor is received and then on to a storage rack (34) to dry and to be tied into bundles for shipment.

Figure 2:
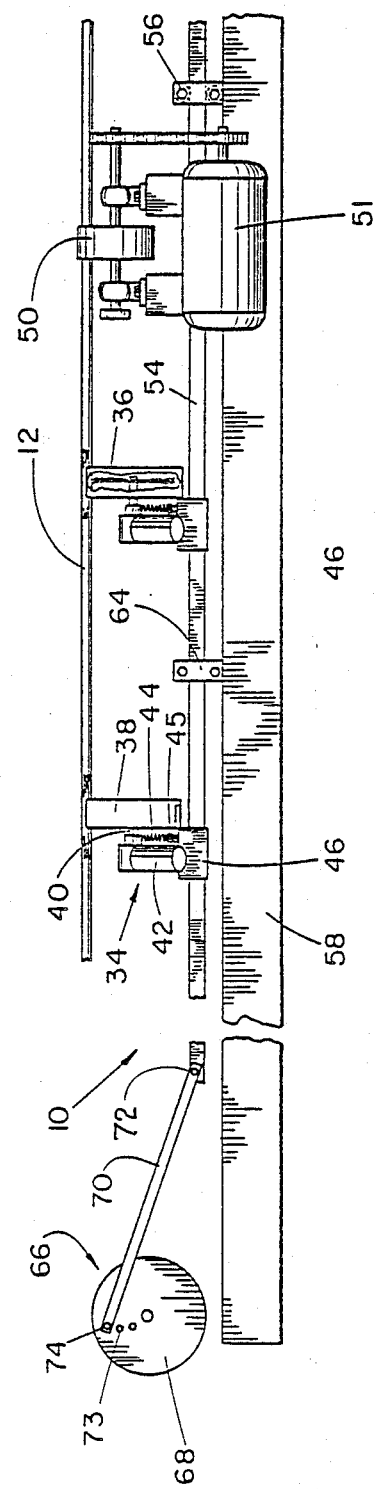
FIG. 2 is a partial side view of a rod cleaning apparatus.

Referring now to FIG. 2, there may be seen a partial side view of the rod cleaning apparatus (10). A frame (58) has along its axis a linear member (54) which passes through linear member guides (56). These linear member guides (56) are secured in place by guide brackets (64) which are attached to the frame (58). These member guides function to reduce drag and allow easy linear movement of member (54).

A means for moving the linear member back and forth along the axis of the frame, such as a wheel (68) and push rod (70), is connected to one end of the linear reciprocating member (54). One end of the push rod (70) is connected to the linear member (54) by a pivot pin (72) and the other end of the push rod (70) is releasably connected to a point on the radial surface of the wheel (68). One convenient way of making this wheel attachment is with a wheel pin (74) secured through one of a plurality of planar holes (73) through the wheel (68) at different radial distances from the wheel axis. The wheel (68) may be driven at variable speeds in a conventional manner by a motor (not shown). Accordingly, the rotating wheel causes reciprocation of the linear member (54) and the pre-selection of a hole (73) for connecting the push rod controls the stroke of the reciprocating member.

Releasably mounted at pre-selected points along the length of the member (54) are a plurality of brush assemblies (34). These brush assemblies include a brush support (46) for releasably attaching a high-speed motor (42) and brush (36) to reciprocating member (54) at the pre-selected point. This brush support may be a wide C-clamp releasably attached by a number of methods well known in the art. A pair of hand tightened wing bolts has been found convenient for rapid attachment.

The high speed motor may be either hydraulic or electric and should be capable of rotating the brush approximately 10,000 rpm. A 5.5 amp 120 V, ⅓ hp electric motor has been found well suited for this purpose. If desired, reciprocating member (54) may include indices for rapid location of the proper attachment point. Optionally, a dust guard (38) may surround that portion of the wire brush (36) not in contact with rod (12).

In a preferred embodiment of the present invention one end of motor (42) is pivotally attached to brush support (46) and the other end of motor (42) is attached to brush support (46) by a spring or bias (44). This bias (44) is held in partial compression by the weight of motor (42) and may be adjusted by bias adjustment screw (45).

A metal wire wheel brush (36) is rotatably connected to motor (42) by a shaft (40). When the brush assembly is mounted on reciprocating member (54), this wheel brush (36) is radially positioned to intersect the rod axis. In this way when a rod is placed in the trough of rod cleaning apparatus (10) and held in place along the rod axis, wheel brush (36) is urged against the surface of the rod by a substantially constant force controlled by the resilience of the bias (44). This "bias loading" feature is preferred because the rod may wobble during its rotation and individual bias-loaded wheel brushes facilitates constant pressure and even cleaning.

In a less preferred, alternative embodiment of the present invention, the brush assembly comprises a single long drive shaft containing a plurality of wheel brushes slidably mounted thereon. In this alternative embodiment, a larger high speed motor and each end of the drive shaft could be similarly mounted on the linear member as described earlier. The wheel brushes are moved along the drive shaft to preselect the desired cleaning location and held in place by conventional set screws. Even though the entire drive shaft may be bias loaded, this arrangement it does not always compensate for the wobble of the rotating rod and uncleaned areas may occur.

Figure 3:
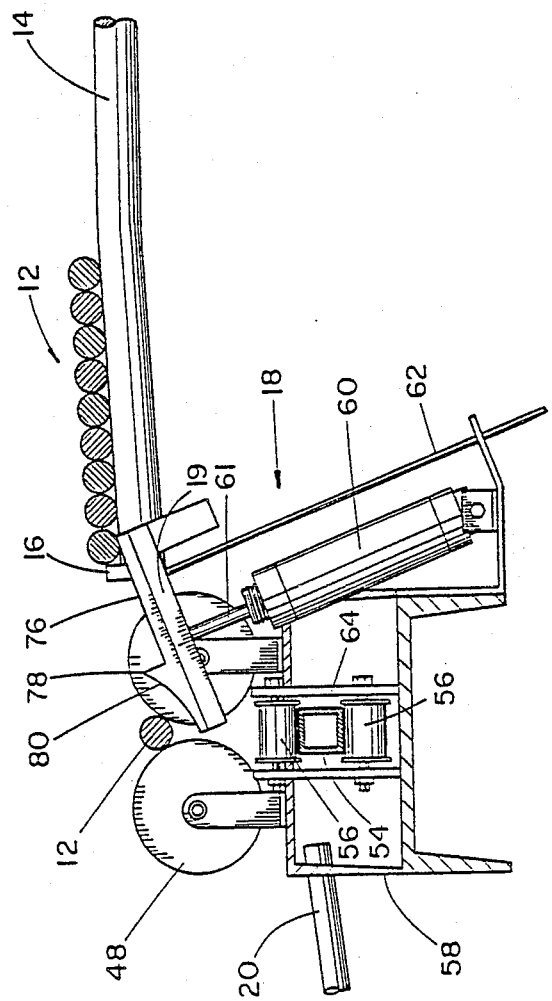
FIG. 3 is a cross-sectional view of the cleaning apparatus of FIG. 2.

Referring now to FIG. 3, there may be seen a cross-sectional view of the rod cleaning apparatus (10) having a rod in place. Frame (58) has attached thereto a plurality of guide brackets (64) each housing member guides (56). Member guides (56) are rotatably secured within guide brackets (64) to facilitate the reciprocal movement of the linear member (54) along the axis of the frame (58). Guide rollers (48) are mounted atop the frame with their axes set at an angle to the rod axis, as more clearly shown in FIG. 1, to rotatably secure a rod (12) to be cleaned. It is understood that these guide rollers may be staggered on opposite sides of the rod axis or grouped into radially opposite but axially equal pairs.

Rods to be cleaned rest upon inclined rack (14) and are placed one at a time in the trough formed by the plurality of guide rollers (48) and drive rollers (50) throughout the axis of the frame. A plurality of index assemblies (18) remove the previously cleaned rod and, simultaneously, place a new rod in position in the trough. Each index assembly (18) is composed of a hydraulic cylinder (60) having its base mounted on the frame and having fixed on its actuator arm (61) a knife-like index plate (19) for engaging the rod. Index plate (19) has a planar loading edge (76) and a discharge edge (80), which may be curved or straight, separated by a projection (78). A cylinder guide (62) may be employed to steady the movement of the cylinder actuator arm (61) and index plate (19).

When the hydraulic cylinder (60) is actuated and the index plate (19) is extended, curved discharge edge (80) strikes the bottom of the rod currently in the trough and kicks it out of the trough and over the radially opposite guide roller onto discharge rack 20). It may also be seen that as the index plate is extended, the loading edge (76) of index plate (19) engages the bottom of the next adjacent rod on rack (14) and lifts it over rack stop (16). As the cylinder continues to extend, the rod rolls down the loading edge face (76) until it stops against projection (78). At full extension the rod is now above the inner surface of the trough formed by the guide rollers but below the top portion of the near guide roller.

As the cylinder (60) retracts, the rod strikes the inner surface of the near roller and is pulled off the o index plate by guide rollers (48) and drive rollers (50) and dropped into the trough. This process is facilitated if the drive rollers are rotating counter-clockwise. The index plate (19) is now fully retracted and in position for another cycle. In this manner a single cycle of the hydraulic cylinder (60) discharges the previously cleaned rod from the rod cleaning apparatus (10) onto rack (20) while simultaneously positioning a new rod to be cleaned in its place.

Referring now to FIGS. 1, 2 and 3 as the apparatus of the present invention is in operation, a rod is automatically removed from the support rack (14) and placed in the trough formed by the guide rollers and drive rollers. The plurality of drive rollers rotate the rod and the inclined guide rollers urge the rod 10 against the rotary stop plate (52) to secure the rod in position. The preselected number of brush assemblies, which have been previously secured at the desired locations along the linear member, are actuated and the high speed brushes abrade the rod to remove rust and coating.

The push wheel (68) is slowly rotated at a speed appropriate to the degree of cleaning required and linear member (54) reciprocates along its axis carrying the high speed brushes. A number of precisely defined lengths of rod are brushed clean corresponding to the number of brushes on the linear member. Thereafter, this cleaned rod is kicked out of position by the index assemblies onto discharge rack (20) and another rod to be cleaned is put in its place.

The cleaned rod rolls down inclined discharge rack (20) and is placed onto an appropriate conveyer to receive rod guides exactly over the cleaned areas. Thereafter, the molded rod is dipped in corrosion inhibitor, dried and bundled for shipment.

As discussed earlier, in the conventional rod guide molding operation the cleaning preparation step is the speed limiting step in the process. A typical dual mold injection machine of the type commonly used can simultaneously mold two guides in 30 seconds for an average time per guide of 15 seconds. Accordingly a batch of rods to receive eight guides each would require about 2 minutes each for molding.

Using the apparatus of the present invention, a typical rod to have eight mold sites cleaned thereon may be processed from support rack to conveyer (22) in approximately 30 seconds. Using the best prior art sandblasting or solvent cleaning system known to inventors, a similar rod would require a processing time of approximately 160 seconds. Clearly the molding process would be delayed to wait for the cleaned rods, resulting in inefficient use of the capital intensive molding equipment. (On the other hand, the present apparatus could supply multiple molding machines wit cleaned rods, if required, without wasted time.)

If the number of mold sites is increased to twelve, the prior art cleaning system requires approximately 240 seconds per rod. In contrast, the system of the present invention may still process this rod in 30 seconds by merely increasing the number of inexpensive brush assemblies on the linear member. This represents an eightfold improvement in rod processing time.

We claim:

1. In an automated system for molding a polymer rod guide onto an oilfield sucker rod, the system including a rod feeding means, an apparatus for cleaning a predetermined section of the rod to receive the rod guide, a conveying means for conveying the cleaned rod and an injection molding apparatus for receiving the clean rod and molding a rod guide thereon, the rod cleaning apparatus comprising:

a substantially linear member having a member axis and secured to a frame, the linear member moveable along the member axis;

a means for reciprocating the linear member along the member axis a pre-selected stroke distance;

a means for rotating a rod to be cleaned about a rod axis substantially parallel the member axis;

a plurality of guide rollers mounted on the frame on radially opposite sides of the rod axis and spaced radially together sufficiently close to rotatably support the rod therebetween along the rod axis to secure the rod in position for cleaning; and a brush assembly releasably mounted on the linear member, the brush assembly including;

a rotatable wire brush on a shaft for engaging and cleaning a point on the rod, a rotationally powered shaft for rotating the brush when the brush is engaged against the rod, and a brush support for releasably mounting the brush at a preselected point along the linear member, so that when the brush assembly is releasably mounted at a preselected point on the reciprocating linear member and a brush is engaged against the rod and rotated, the movement of the reciprocating linear member cleans a predetermined length of the rod.

2. The apparatus of claim 1 wherein a bias means is interposed between the brush support and the rotating brush to maintain a substantially uniform pressure when the brush is engaged against the rod.

3. The apparatus of claim 1, wherein the brush assembly includes a plurality of brushes on a single 4. The apparatus of claim 1, wherein at least two of the plurality of guide rollers establish a pair of guide rollers having parallel guide roller axes for supporting the rod to be cleaned along the rod axis.

5. The apparatus of claim 4, wherein the parallel guide roller axes are at an angle relative to the rod axis sufficient to impart a bias force in the axial direction to the rod.

6. The apparatus of claim 5, wherein the parallel roller axes are at an angle between 10° and 15° relative to the rod axis.

7. The apparatus of claim 4, wherein each guide roller of the pair are on radially opposite sides of rod axis and axially equal along the rod axis.

8. The apparatus of claim 1, wherein the means for rotating the rod about the rod axis includes a pair of rotationally powered drive rollers having parallel roller axes for rotatably supporting the rod to be cleaned along a rod axis, each drive roller of the pair mounted on the frame on radially opposite sides of the rod axis and spaced radially together sufficiently close to support and rotate the rod therebetween.

9. The apparatus of claim 1, wherein the drive motor attached to the shaft can rotate the shaft at least 10,000 revolutions per minute.

10. The apparatus of claim 1 wherein the means for rotating a rod about the rod axis can rotate the rod between 100 and 170 revolutions per minute.

11. The apparatus of claim 1 including a plurality of brush assembles releasably mounted at different preselected points along the linear member to simultaneously engage and clean a plurality of points on the rod.

* * * * *